(12) United States Patent
Jeon (10) Patent No.: US 10,810,424 B2
(45) Date of Patent: Oct. 20, 2020

(54) METHOD AND APPARATUS FOR GENERATING VIRTUAL DRIVING LANE FOR TRAVELING VEHICLE

(71) Applicant: SAMSUNG ELECTRONICS CO., LTD., Suwon-si (KR)

(72) Inventor: Paul Barom Jeon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 15/624,011

(22) Filed: Jun. 15, 2017

(65) Prior Publication Data
US 2018/0129854 A1 May 10, 2018

(30) Foreign Application Priority Data
Nov. 9, 2016 (KR) .................. 10-2016-0148668

(51) Int. Cl.
*G06K 9/00* (2006.01)
*G06T 19/00* (2011.01)
*G08G 1/16* (2006.01)

(52) U.S. Cl.
CPC ....... *G06K 9/0063* (2013.01); *G06K 9/00798* (2013.01); *G06K 9/00805* (2013.01); *G06T 19/006* (2013.01); *G08G 1/166* (2013.01); *G08G 1/167* (2013.01)

(58) Field of Classification Search
CPC .......... G06K 9/00798; G06K 2209/23; G06K 9/00476; G06K 9/00805; G06K 9/00812; G06K 9/4647; G06K 9/4671; G08G 1/166; G08G 1/167; G08G 1/16; G08G 1/161; G08G 1/165; B60R 1/00; B60R 2300/105; B60R 2300/303
See application file for complete search history.

(56) References Cited

U.S. PATENT DOCUMENTS

| | | | | |
|---|---|---|---|---|
| 4,551,801 A | * | 11/1985 | Sokol | G07C 5/10 340/462 |
| 5,155,426 A | * | 10/1992 | Kurami | G05D 1/0246 180/168 |
| 5,754,966 A | * | 5/1998 | Ichikawa | B62D 7/159 180/410 |
| 9,707,961 B1 | * | 7/2017 | Halder | B60W 40/04 |

(Continued)

FOREIGN PATENT DOCUMENTS

| | | |
|---|---|---|
| JP | 3352655 B2 | 9/2003 |
| JP | 3800901 B1 | 6/2006 |
| KR | 10-0956858 B1 | 5/2010 |

OTHER PUBLICATIONS

Kim, Heungryong, and Seonbong Lee. "A study on image processing algorithms for improving lane detectability at night based on camera." Transactions of the Korean Society of Automotive Engineers 21.1 (2013):51-60.

*Primary Examiner* — Ming Wu
(74) *Attorney, Agent, or Firm* — Sughrue Mion, PLLC (57) ABSTRACT

Disclosed is a virtual driving lane generation method and apparatus for recognizing vehicles near a host vehicle, extracting feature information indicating a directionality of the nearby vehicles, generating a virtual auxiliary driving lane based on the feature information, and generating a virtual driving lane for the host vehicle based on the virtual auxiliary driving lane and the side line information.

29 Claims, 9 Drawing Sheets

(56) References Cited

U.S. PATENT DOCUMENTS

| | | | |
|---|---|---|---|
| 2007/0216528 A1* | 9/2007 | Sanma | G08G 1/161 340/506 |
| 2008/0055114 A1* | 3/2008 | Kim | G01S 15/86 340/937 |
| 2008/0158014 A1* | 7/2008 | Zou | G06K 9/00805 340/988 |
| 2011/0026771 A1* | 2/2011 | Hsu | G06K 9/00805 382/104 |
| 2013/0131922 A1* | 5/2013 | Ogata | B60Q 1/143 701/36 |
| 2013/0184926 A1 | 7/2013 | Spero et al. | |
| 2014/0172221 A1 | 6/2014 | Solyom et al. | |
| 2014/0266858 A1* | 9/2014 | Blanke | G01S 13/91 342/66 |
| 2014/0306844 A1* | 10/2014 | Kim | G01S 13/867 342/385 |

* cited by examiner

METHOD AND APPARATUS FOR GENERATING VIRTUAL DRIVING LANE FOR TRAVELING VEHICLE

CROSS-REFERENCE TO RELATED APPLICATION(S)

This application claims the benefit under 35 USC § 119(a) of Korean Patent Application No. 10-2016-0148668 filed on Nov. 9, 2016, in the Korean Intellectual Property Office, the entire disclosure of which is incorporated herein by reference for all purposes.

BACKGROUND

1. Field

The following description relates to methods and apparatuses for generating a virtual driving lane for a vehicle.

2. Description of Related Art

Various techniques are used to support the driving of a host vehicle based on ambient image information. A lane may be detected from a front-view image captured from a vehicle. When it is difficult to detect an accurate lane due to nearby vehicles obscuring a portion of the lane, or when it is difficult to detect an accurate lane due to inclement weather conditions such as, for example, snow, rain, and fog, the lane detection of the host vehicle may be hindered. Thus, inaccurate lane detection may create a hazard in traveling.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of generating a virtual driving lane, the method including recognizing vehicles nearby a host vehicle, extracting feature information indicating a directionality of the nearby vehicles, and generating a virtual driving lane for the host vehicle based on the feature information.

The feature information may include any one or any combination of a feature line associated with a driving direction of the nearby vehicles and feature points indicating the driving direction of the nearby vehicles.

The feature line may include a traffic flow line formed by front nearby vehicles that are located in front of the host vehicle, and the feature points may include at least a portion of the front nearby vehicles.

The extracting of the feature information may include extracting the feature information using any one or any combination of a front-view image captured from the host vehicle and a side-view image captured from the host vehicle.

The extracting of the feature information may include calculating, based on a front-view image captured from the host vehicle, any one or any composition of a traffic flow line formed by front nearby vehicles that are located in front of the host vehicle, a first angle between the traffic flow line and a driving direction of the host vehicle, and a second angle between a horizontal location of the host vehicle and a line on feature points formed based on at least portions of the front nearby vehicles.

The method may include calculating a representative line corresponding to a driving direction of the nearby vehicles using at least one of the traffic flow line, the first angle, or the second angle, and generating a virtual auxiliary driving lane based on the representative line.

The method may include extracting, from a side-view image captured from the host vehicle, side line information including at least portions of nearby vehicles located to the left and right of the host vehicle and left and right driving road lines of the host vehicle.

The generating of the virtual driving lane may include generating the virtual driving lane based on the virtual auxiliary driving lane and the side line information.

The generating of the virtual driving lane may include generating the virtual driving lane based on overlapping the side line information with the virtual auxiliary driving lane.

The generating of the virtual driving lane may include applying an offset to the virtual auxiliary driving lane based on a result of the overlapping.

The recognizing of the nearby vehicles may include recognizing the nearby vehicles traveling in a same direction as the host vehicle.

The second angle may include an angle formed between a line parallel to a front portion of the host vehicle and a straight line passing the feature points located at a rear of a nearby vehicle located in front of the host vehicle.

The recognizing of the vehicles nearby the host vehicle may include forming a virtual box around the host vehicle based on a location of the host vehicle, and recognizing the vehicles within coordinates of the virtual box as the nearby vehicles.

The feature points may include any one or any combination of rear lights and points corresponding to centers on rear trunks of the front nearby vehicles.

In one general aspect, there is provided an apparatus for generating a virtual driving lane, the apparatus including a processor configured to recognize vehicles nearby a host vehicle, to extract feature information indicating a directionality of the nearby vehicles, and to generate a virtual driving lane for the vehicle based on the feature information.

The feature information may include any one or any combination of a feature line associated with a driving direction of the nearby vehicles and feature points indicating the driving direction of the nearby vehicles, the feature line may include a traffic flow line formed by front nearby vehicles that are located in front of the host vehicle, and the feature points may include at least a portion of the front nearby vehicles.

The apparatus may include a vision sensor configured to capture at least one of a front view image or a side view image from the host vehicle, wherein the processor may be further configured to extract the feature information using the at least one of the front view image or the side view image.

The processor may be configured to calculate, based on a front-view image captured from the host vehicle, any one or any combination of a traffic flow line formed by front nearby vehicles that are located in front of the host vehicle, a first angle between the traffic flow line and a driving direction of the host vehicle, and a second angle between a horizontal location of the host vehicle and a line on feature points formed based on at least portions of the front nearby vehicles.

The processor may be configured to calculate a representative line corresponding to a driving direction of the nearby vehicles using at least one of the traffic flow line, the first angle, or the second angle and to generate a virtual auxiliary driving lane based on the representative line.

The processor may be configured to extract, from a side-view image captured from the host vehicle, side line information including at least portions of nearby vehicles located to the left and right of the host vehicle and left and right driving road lines of the host vehicle.

The processor may be configured to generate the virtual driving lane based on overlapping the side line information with the virtual auxiliary driving lane.

The processor may be configured to recognize the nearby vehicles traveling in a same direction as the host vehicle.

In one general aspect, there is provided a digital device including a sensor configured to recognize vehicles near a vehicle and to capture side line information, a memory configured to store instructions, and a processor configured to execute the instructions to extract feature information associated with a driving direction of the recognized vehicles, to generate a virtual auxiliary driving lane based on the feature information, and to generate a virtual driving lane for the vehicle based on overlapping the virtual auxiliary driving lane with the side line information.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise.

The following embodiments may be used to generate a virtual driving lane that is applied to control a vehicles for actions, such as, for example, lane keeping, lane changing, and speed adjustment of a host vehicle traveling when it is difficult to detect an accurate lane due to nearby vehicles obscuring a portion of the lane or when it is difficult to detect the accurate lane due to a low illumination or inclement weather conditions, such as, for example, snow, rain, or fog.

The apparatus to generate a virtual driving lane may be embedded in or interoperate with various digital devices such as, for example, an intelligent agent, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein or various other Internet of Things (IoT) devices that are controlled through a network. The digital devices may be implemented in a smart appliance, an intelligent automobile, and an autonomous driving vehicle including a camera or a vision sensor.

The digital devices may also be implemented as a wearable device, which is worn on a body of a user. In one example, a wearable device may be self-mountable on the body of the user, such as, for example, a ring, a watch, a pair of glasses, glasses-type device, a bracelet, an ankle bracket, a belt, a band, an anklet, a belt necklace, an earring, a headband, a helmet, a device embedded in the cloths, or as an eye glass display (EGD), which includes one-eyed glass or two-eyed glasses.

Figure 1:
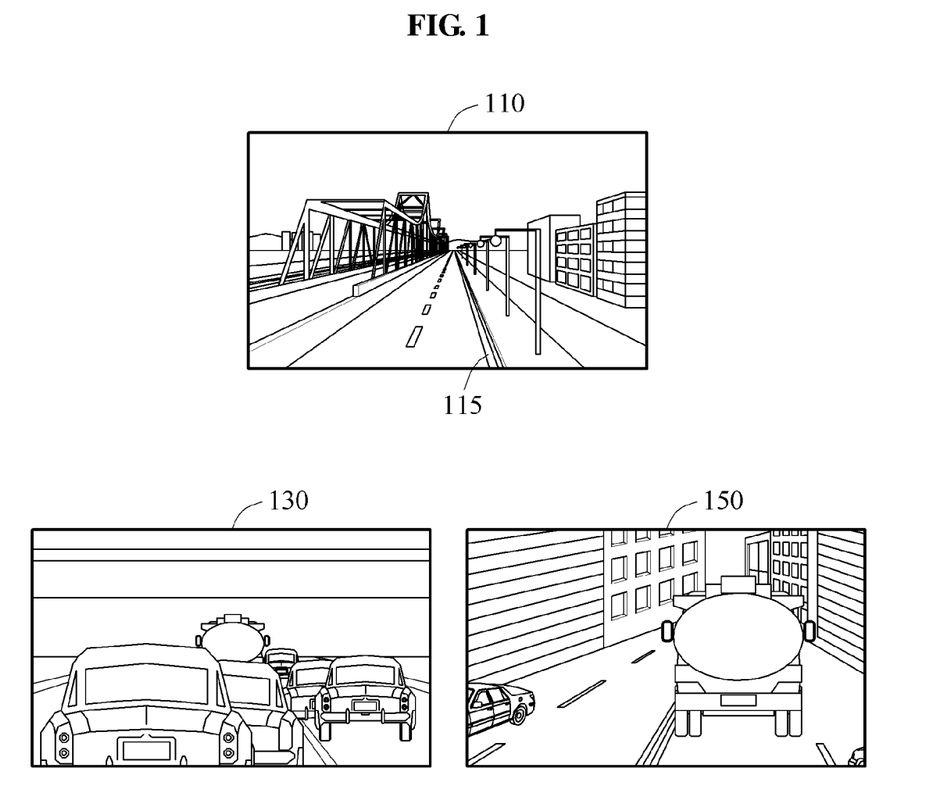
FIG. 1 is a diagram illustrating an example of a situation in which a virtual driving lane is generated.

FIG. 1 is a diagram illustrating an example of a situation in which a virtual driving lane is generated. Referring to FIG. 1, a lane is clearly recognized in an image 110 of a front view captured from a host vehicle during driving whereas the lane is not recognized clearly in images 130 and 150.

In image 110, a lane 115 is relatively clearly recognized. In image 110, the lane 115 is sufficiently acknowledged based on images captured through a vision sensor without need to generate a virtual driving lane.

In image 130, it is difficult to detect an accurate lane because the road is full of vehicles and a great portion of a lane is obscured by other vehicles. In the image 150, only a portion of a lane is recognized due to a large-sized vehicle being located in front of the host vehicle, thus, it is difficult to fully recognize a driving lane. In other examples, a situation may arise where detection of an accurate lane is difficult due to natural phenomenon such as inclement weather conditions caused by snow, rain, fog or wind. In another example, a detection of an accurate lane is difficult due to a road being covered with snow may also exist.

When a lane is invisible due to a vehicle, an obstacle, or natural phenomenon and accurate lane detection is difficult, an apparatus for generating a virtual driving lane extracts feature information indicating a directionality of nearby vehicles traveling in the same direction as a host vehicle and generates the virtual driving lane. Hereinafter, the apparatus for generating a virtual driving lane is also referred to as a generation apparatus, and a vehicle located nearby a host vehicle is also referred to as a nearby vehicle.

The apparatus for generation the virtual driving lane provides a virtual driving lane used to control a host vehicle such as lane keeping, lane changing, and speed adjustment. Thus, the host vehicle may determine an accurate driving direction although a lane is invisible due to a weather condition or a nearby vehicle. In an example, the apparatus for generation the virtual driving lane is a host vehicle, or a device included in the host vehicle.

Figure 2:
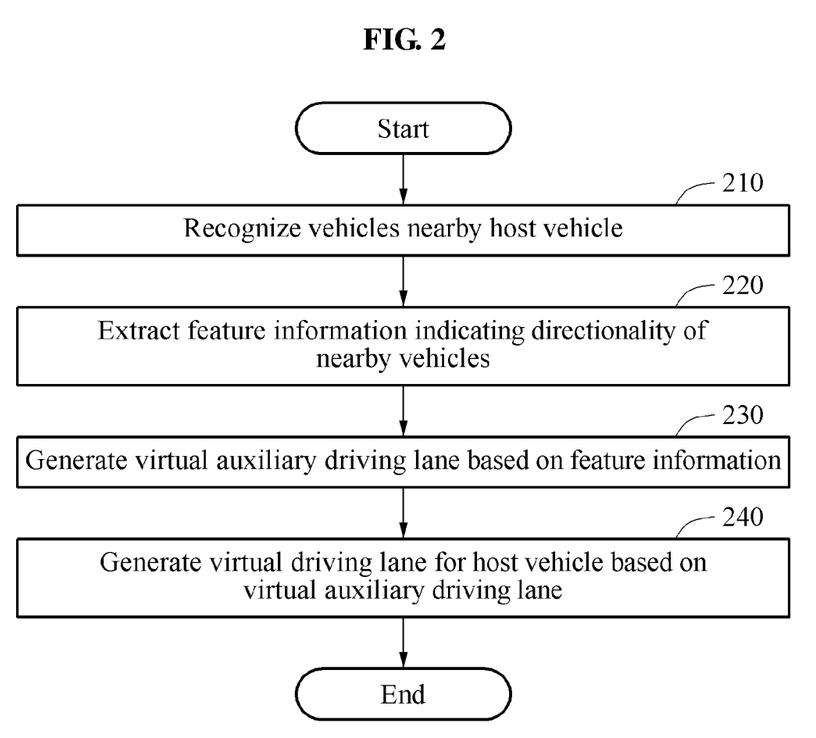
FIG. 2 is a diagram illustrating an example of a method of generating a virtual driving lane.

FIG. 2 is a diagram illustrating an example of a method of generating a virtual driving lane. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the above descriptions of FIG. 1 is also applicable to FIG. 1, and are incorporated herein by reference. Thus, the above description may not be repeated here.

Referring to FIG. 2, in 210, an apparatus for generating a virtual driving lane recognizes vehicles near a host vehicle. The apparatus for generation the virtual driving lane recognizes vehicles traveling near the host vehicle in the same direction as the host vehicle. In this disclosure, the host vehicle is currently traveling vehicle. Nearby vehicles are vehicles located in front of the host vehicle, to the left of the host vehicle, or to the right of the host vehicle and are sensed by a capturing device and/or sensor during driving.

For example, the apparatus for generating a virtual driving lane forms a virtual box including the host vehicle based on a location or coordinates of the host vehicle and recognizes nearby vehicles external to the host vehicle based on the coordinates of the virtual box. In this example, the apparatus for generation the virtual driving lane recognizes the nearby vehicles based on information obtained through sensing or capturing of information by various sensors included in the host vehicle. Also, the apparatus for generation the virtual driving lane uses various known techniques to recognize the nearby vehicles of the host vehicle.

In 220, the apparatus for generating a virtual driving lane extracts feature information indicating a directionality of the nearby vehicles. The directionality of the nearby vehicles includes, for example, a mainstream of the nearby vehicles based on a location of the host vehicle and/or a driving lane, and a horizontal angle and a vertical angle of the mainstream of the nearby vehicles relative to the location of the host vehicle and the driving lane. The apparatus for generation a virtual driving lane extracts the feature information based on at least one of a front-view image captured from the host vehicle or a side-view image captured from the host vehicle. Using the front-view image captured from the host vehicle, the apparatus for generation the virtual driving lane calculates at least one of a traffic flow line formed by nearby vehicles located in front of the host vehicle, a first angle between the traffic flow line and a driving direction of the host vehicle, a line on feature points formed based on at least a portion of the nearby vehicles located in front of the host vehicle, and a second angle between the driving direction of the host vehicle and the line on the feature points.

The feature information includes at least one of a feature line associated with a driving direction of the nearby vehicles or feature points indicating the driving direction of the nearby vehicles. The feature line includes, for example, the traffic flow line formed by the nearby vehicles located in front of the host vehicle. In an example, the feature points include at least a portion of the nearby vehicles located in front of the host vehicle. The points includes, for example, points corresponding to rear lights of the nearby vehicles and points corresponding to centers on rear trunks of the nearby vehicles.

In 230, the apparatus for generation the virtual driving lane generates a virtual auxiliary driving lane based on the feature information extracted in 220. The apparatus for generation the virtual driving lane generates the virtual auxiliary driving lane based on the feature line or the feature points extracted in 220. In this example, the apparatus for generation the virtual driving lane detects unobscured side lines from left and right view images captured by a vision sensor or sensed by a line sensor, combines the detected side lines and the feature line or the feature points extracted in 220, and generates the virtual auxiliary driving lane.

In an example, the virtual auxiliary driving lane is a single virtual driving lane corresponding to a guide based on a center on the host vehicle. In another example, the virtual auxiliary driving lane is defined by two lines on both sides of the host vehicle or indicating left and right widths of a vehicle. A method of generating the virtual auxiliary driving lane using the apparatus for generation the virtual driving lane will be described with reference to FIG. 3.

In 240, the apparatus for generation the virtual driving lane generates a virtual driving lane for the host vehicle based on the virtual auxiliary driving lane generated in 230. The apparatus for generation the virtual driving lane integrally analyzes the virtual auxiliary driving lane and an actual driving lane and generates the virtual driving lane of the host vehicle. The apparatus for generation the virtual driving lane detects actual driving road lines not obscured on both sides of the vehicle using a side-view capturing device. In an example, the apparatus for generation the virtual driving lane overlaps the virtual auxiliary driving lane with the actual driving road lines detected using left and right cameras of the host vehicle, and generates a forward driving lane. A method of generating the virtual driving lane using the apparatus for generation the virtual driving lane will be described with reference FIG. 4.

Figure 3:
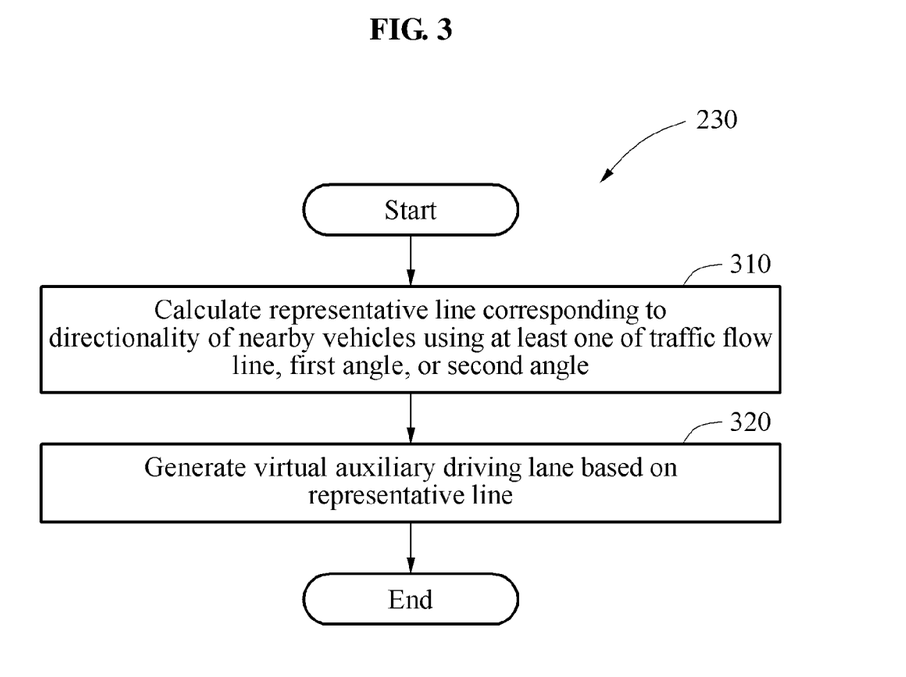
FIG. 3 is a diagram illustrating an example of a method of generating a virtual auxiliary driving lane in accordance with an embodiment.

FIG. 3 is a diagram illustrating an example of a method of generating a virtual auxiliary driving lane. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the above descriptions of FIGS. 1-2 is also applicable to FIG. 3, and are incorporated herein by reference. Thus, the above description may not be repeated here.

Referring to FIG. 3, in 310, an apparatus for generation the virtual driving lane calculates a representative line corresponding to a driving direction of vehicles near a host vehicle based on at least one of a traffic flow line formed by nearby vehicles located in front of the host vehicle, a first angle between the traffic flow line and a driving direction of the host vehicle, or a second angle between a horizontal location of the host vehicle and a line on feature points formed based on at least a portion of the nearby vehicles located in front of the host vehicle. In an example, the driving direction of the nearby vehicles, the first angle, and the second angle are obtained from a front-view image captured from the host vehicle.

In 320, the apparatus for generation the virtual driving lane generates a virtual auxiliary driving lane based on the representative line. A method of generating the virtual auxiliary driving lane using the apparatus for generation the virtual driving lane will be described with reference to FIG. 6.

Figure 4:
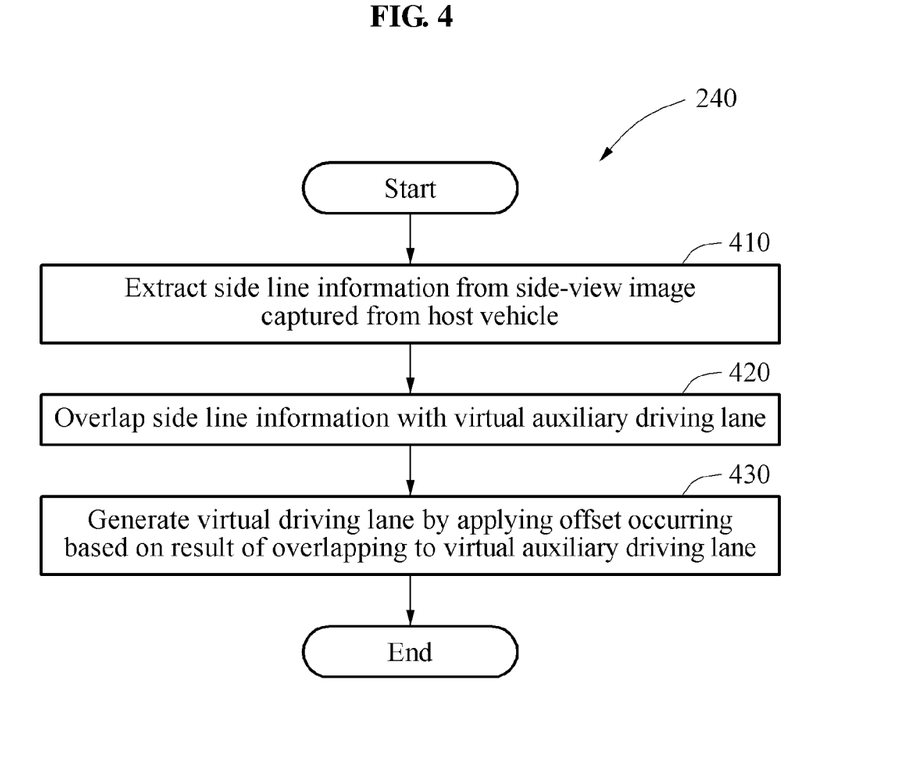
FIG. 4 is a diagram illustrating an example of a method of generating a virtual driving lane.

FIG. 4 is a flowchart illustrating a method of generating a virtual driving lane in accordance with an embodiment. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the above descriptions of FIGS. 1-3 is also applicable to FIG. 4, and are incorporated herein by reference. Thus, the above description may not be repeated here.

Referring to FIG. 4, in 410, an apparatus for generation the virtual driving lane extracts side line information from left and right view images captured from a host vehicle. The side line information includes left and right driving road lines of the host vehicle and at least portions of sides of nearby vehicles located to the left and right of the host vehicle. The at least portions of sides of the nearby vehicles include, for example, lower end portions of sides of the nearby vehicles of the host vehicle.

The apparatus for generation the virtual driving lane generates a virtual driving lane based on the virtual auxiliary driving lane and the side line information. In 420, the apparatus for generation the virtual driving lane overlaps the side line information of the host vehicle with the virtual auxiliary driving lane. The apparatus for generation the virtual driving lane overlaps the left and right driving road lines detected using cameras on both sides of the host vehicle with the virtual auxiliary driving lane. The apparatus for generation the virtual driving lane generates the virtual driving lane based on a result of the overlapping. A method of overlapping side line information of the host vehicle with the virtual auxiliary driving lane using the apparatus for generation the virtual driving lane will be described with reference to FIGS. 7 and 8.

In 430, the apparatus for generation the virtual driving lane applies an offset occurring based on the result of the overlapping to the virtual auxiliary driving lane and generates the virtual driving lane.

Figure 5:
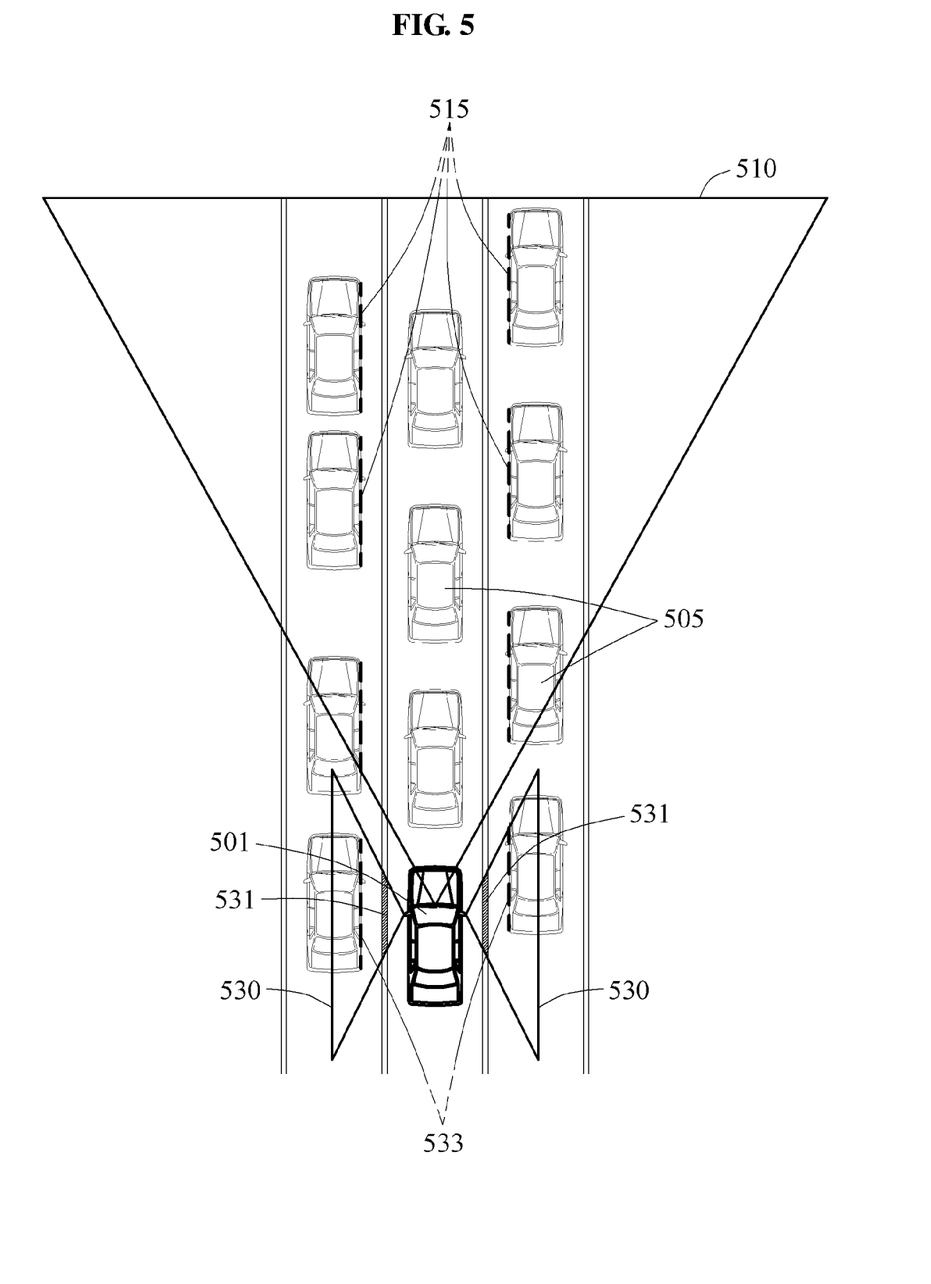
FIG. 5 is a diagram illustrating an example of a method of generating a virtual driving lane.

FIG. 5 is a diagram illustrating an example of a method of generating a virtual driving lane. FIG. 5 illustrates a host vehicle 501 and nearby vehicles 505. In the example of FIG. 5, it is understood that an apparatus for generation the virtual driving lane is embedded in a host vehicle.

In an example, the host vehicle 501 includes a front-view capturing device configured to capture a front view from the host vehicle 501 and a side-view capturing device configured to capture a left view and a right view from the host vehicle 501. A capturing device includes, for example, a vision sensor, a camera, and a line sensor. In an example, a range 510 of the front view captured by the front-view capturing device may differ from a range 530 of a side view captured by the side-view capturing device.

When it is difficult to detect lanes in front of the host vehicle 501 due to an obscured visual field of the front-view capturing device, the host vehicle 501 detects a dashed-portion 515 of a lower end portion of a side of a vehicle, and sets the detected dashed-portion 515 to be a feature line. The host vehicle 501 determines or generates a virtual auxiliary driving lane using detected feature lines, for example, the dashed-portion 515. The host vehicle 501 generates a virtual auxiliary driving lane set-off by a predetermined distance from the detected feature lines. In an example, the host vehicle 501 also uses feature lines 533 detected through the side-view capturing device to determine or generate the virtual auxiliary driving lane.

The host vehicle 501 captures an actual driving lane 531 that is not obscured by the nearby vehicles 505 on both sides of the host vehicle 501 using the side-view capturing device.

The host vehicle 501 overlaps the actual driving lane 531 with the virtual auxiliary driving lane and generates a virtual driving lane.

Figure 6:
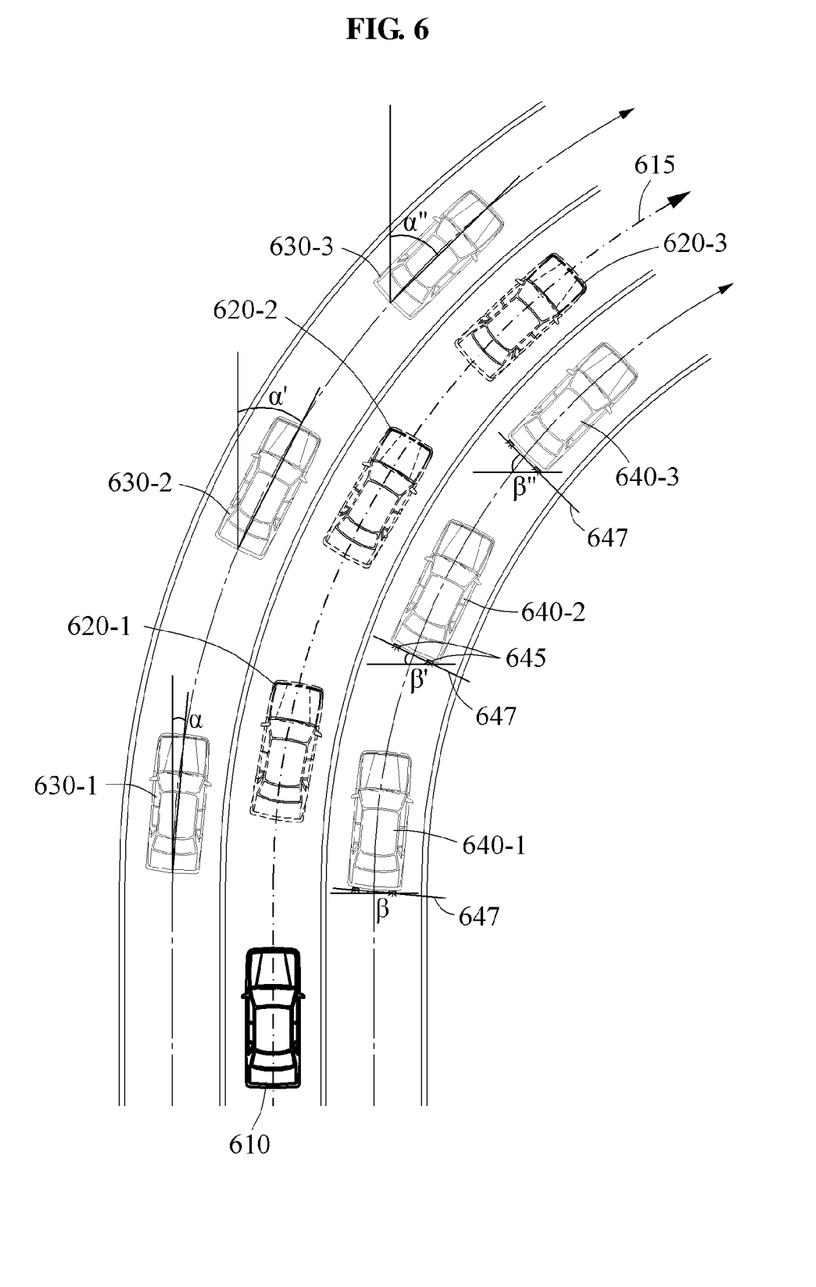
FIG. 6 is a diagram illustrating an example of a method of generating a virtual auxiliary driving lane.

FIG. 6 is a diagram illustrating a method of generating a virtual auxiliary driving lane in accordance with an embodiment. FIG. 6 illustrates a host vehicle 610 and nearby vehicles 620-1, 620-2, 620-3, 630-1, 630-2, 630-3, 640-1, 640-2, and 640-3 of the host vehicle 610.

The apparatus for generation the virtual driving lane calculates a representative line corresponding to a directionality of the nearby vehicles 620-1, 620-2, and 620-3 located in front of the host vehicle 610 using a traffic flow line 615 that is formed by the nearby vehicles 620-1, 620-2, and 620-3 and calculated based on a front view captured from the host vehicle 610. The traffic flow line 615 is a line representing a traffic flow formed by nearby vehicles traveling in the same direction as the host vehicle 610. In an example, the traffic flow line corresponds to an average line following nearby vehicles aligned in series on the same lane as the host vehicle 610. In another example, the traffic flow line corresponds to a lane neighboring the host vehicle 610, and a line following predetermined points of the nearby vehicles aligned in series in the neighboring lane.

The apparatus for generation the virtual driving lane generates a virtual auxiliary driving lane based on the traffic flow line 615 set to be the representative line. The apparatus for generation the virtual driving lane sets the representative line to be the virtual auxiliary driving lane without a change. Also, the apparatus for generation the virtual driving lane generates a pair of left and right virtual auxiliary lines based on the representative line in consideration of a vertical width of the host vehicle 610.

The apparatus for generation the virtual driving lane calculates a representative line corresponding to a driving direction of the nearby vehicles based on a driving direction, for example, a straight-ahead direction of the host vehicle 610 and first angles α, α', and α" between the traffic flow line 615 and the nearby vehicles 630-1, 630-2, and 630-3, respectively. In this example, the apparatus for generation the virtual driving lane calculates the representative line based on the traffic flow line 615 and the first angles α, α', and α". Also, the apparatus for generation the virtual driving lane calculates the representative line based on the first angles α, α', and α" in lieu of the traffic flow line 615.

In an example, the apparatus for generation the virtual driving lane calculates a representative line corresponding to a driving direction of the nearby vehicles 640-1, 640-2, and 640-3 located in front of the host vehicle 610 based on second angles β, β', and β" between a horizontal location of the host vehicle 610 and a line 647 on feature points formed by a rear light 645, of the nearby vehicles 640-1, 640-2, and 640-3, respectively. Other feature points formed by the nearby vehicles 640-1, 640-2, and 640-3 may be used, without departing from the spirit and scope of the illustrative examples described. The apparatus for generation the virtual driving lane calculates the representative line based on the traffic flow line 615 and the second angles β, β', and β". Also, the apparatus for generation the virtual driving lane calculates the representative line based on the second angles β, β', and β" in lieu of the traffic flow line 615. In an example, the second angle is an angle formed between a line parallel to a front portion of the host vehicle and a straight line passing the feature points located at a rear of a nearby vehicle, which is located in front of the host vehicle.

The apparatus for generation the virtual driving lane generates the virtual auxiliary driving lane the representative line.

Figure 7:
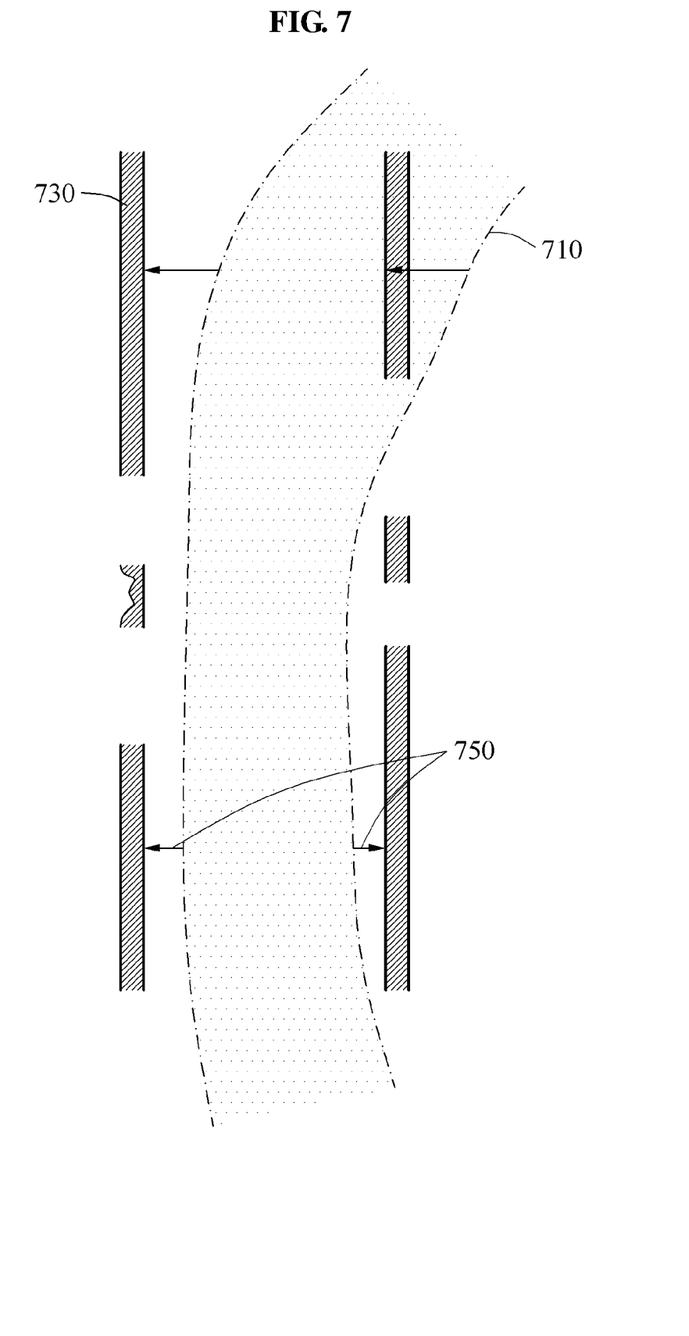
FIGS. 7 and 8 are diagrams illustrating examples of methods of generating a virtual driving lane using a apparatus for generation the virtual driving lane.

FIG. 7 is diagram illustrating an example of a method of generating a virtual driving lane using a apparatus for generation the virtual driving lane. FIG. 7 illustrates virtual auxiliary road lines 710 configured as a pair of left and right lines and actual road lines 730 captured by a side-view capturing device of a host vehicle. In an example of FIG. 7, portions of the actual road lines 730 may be removed or obscured by nearby vehicles.

An apparatus for generation the virtual driving lane extracts, from a side-view image captured from the host vehicle side, line information including the actual road lines 730 on left and right side of the host vehicle and at least portions of sides of nearby vehicles located to the left and right of the host vehicle. In an example, the apparatus for generation the virtual driving lane extracts a lower end portion of a side of a nearby vehicle as the portions of sides of nearby vehicles.

The apparatus for generation the virtual driving lane generates a virtual driving lane based on the virtual auxiliary road lines 710 and the side line information. The apparatus for generation the virtual driving lane overlaps the actual road lines 730 with the virtual auxiliary road lines 710. As a result of the overlapping, when an offset 750 between the virtual auxiliary road line 710 and the actual road line 730 is present, the apparatus for generation the virtual driving lane generates the virtual driving lane by applying the offset occurring based on the result of the overlapping to the virtual auxiliary road lines 710. For example, the apparatus for generation the virtual driving lane extends the virtual auxiliary road lines 710 by the offset 750 and sets the extended virtual auxiliary road lines to be the virtual driving lane, thereby generating the virtual driving lane.

Figure 8:
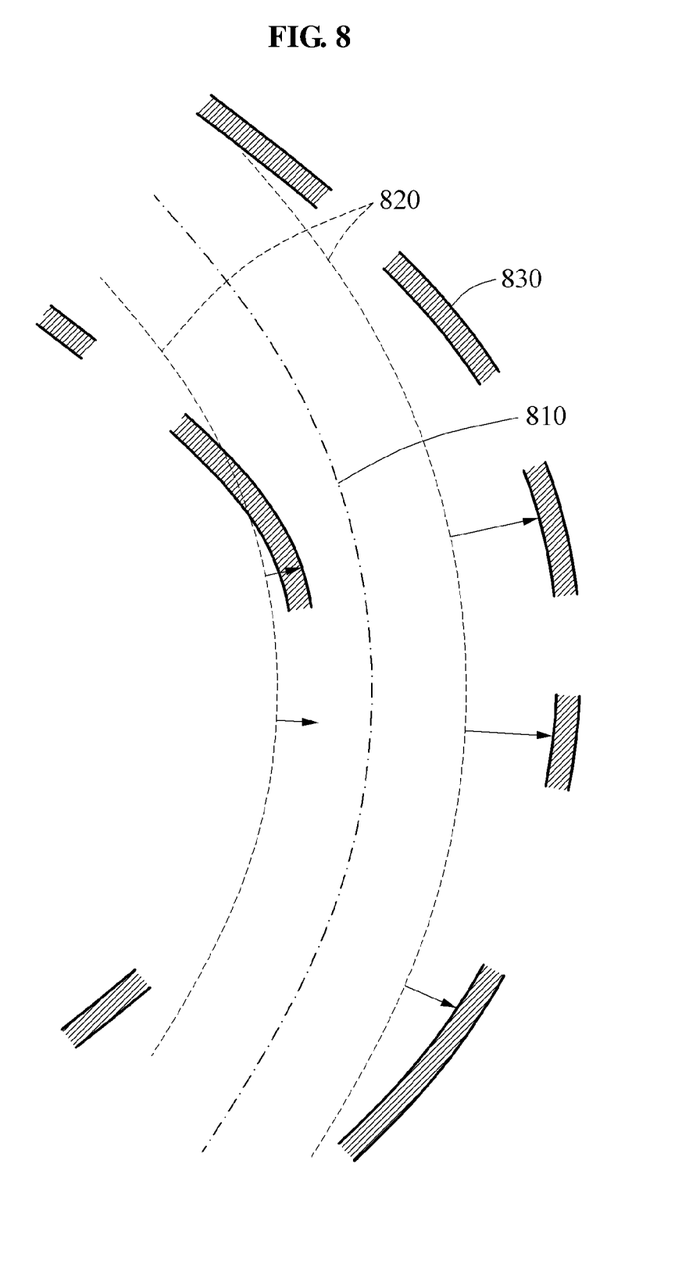

FIG. 8 is diagram illustrating an example of a method of generating a virtual driving lane using an apparatus for generation the virtual driving lane. FIG. 8 illustrates a virtual auxiliary road line 810 corresponding to a single central line and actual road lines 830 captured by a side-view capturing device of the host vehicle.

An apparatus for generation the virtual driving lane generates a virtual driving lane 820 for the host vehicle using the virtual auxiliary road line 810 in consideration of factors, such as, for example, a length and a width of a vehicle based on a type of the host vehicle. In this example, the virtual driving lane 820 has predetermined widths on the left and right sides in contrast to the virtual auxiliary road line 810.

Before generating the virtual driving lane 820, the apparatus for generation the virtual driving lane overlaps a central line of the actual road lines 830 with the virtual auxiliary road lines 710 as described with reference to FIG. 7. In this example, the apparatus for generation the virtual driving lane calculates a position of the central line based on left and right widths of the actual road lines 830, and overlaps the calculated position of the central line of the actual road lines 830 with the virtual auxiliary road line 810.

As a result of the overlapping, when offsets between the virtual auxiliary road line 810 and the actual road lines 830 are present, the apparatus for generation the virtual driving lane generates the virtual driving lane 820 by applying the offsets occurring based on the result of the overlapping to the virtual auxiliary road line 810.

Figure 9:
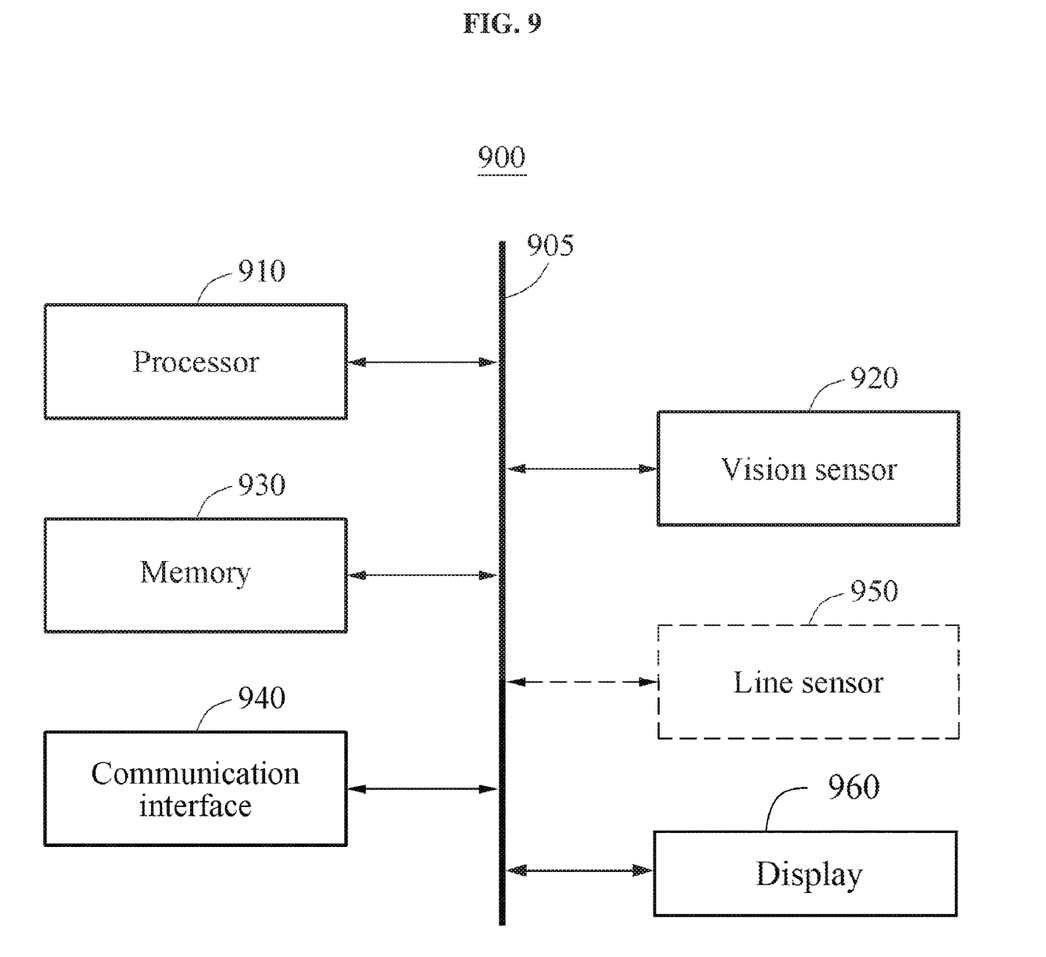
FIG. 9 is a diagram illustrating an example of an apparatus for generating a virtual driving lane.

FIG. 9 is a diagram illustrating an example of an apparatus for generating a virtual driving lane. Referring to FIG. 9, an apparatus for generation the virtual driving lane 900 includes a processor 910, a vision sensor 920, a memory 930, a communication interface 940, a line sensor 950, and a display 960. The processor 910, the vision sensor 920, the memory 930, the communication interface 940, the line sensor 950, and the display 960 are connected to one another through a communication bus 905.

The processor 910 recognizes vehicles near a host vehicle, and extracts feature information indicating a directionality of the nearby vehicles. The feature information includes at least one of a feature line associated with a driving direction of the nearby vehicles or feature points indicating the driving direction of the nearby vehicles. In an example, the feature line includes a traffic flow line formed by nearby vehicles located in front of the host vehicle. In an example, the feature points include portions of the nearby vehicles located in front of the host vehicle. The portions of the nearby vehicles includes, for example, points corresponding to rear lights of the nearby vehicles located in front of the host vehicle and points corresponding to centers of the rear trunks of the nearby vehicles located in front of the host vehicle.

The processor 910 generates a virtual driving lane for the host vehicle based on a virtual auxiliary driving lane generated based on the feature information.

The processor 910 recognizes an actual driving lane and nearby vehicles traveling in the same direction as the host vehicle based on images captured using the vision sensor 920 and the line sensor 950.

In an example, the vision sensor 920 includes a plurality of vision sensors that are provided on a front side and both sides of the host vehicle.

Since black absorbs light and white reflects light, in an example, the line sensor 950 detects a lane or a line based on a degree to which light is reflected based on a color of a floor. In an example, the line sensor 950 is used selectively.

In an example, the processor 910 recognizes the nearby vehicles of the host vehicle based on information received from an external source of the apparatus for generation the virtual driving lane 900 through the communication interface 940.

The vision sensor 920 captures at least one of a front view or a side view from the host vehicle. The processor 910 extracts the feature information using at least one of a front-view image captured from the host vehicle or a side-view image captured from the host vehicle.

The processor 910 calculates, based on the front-view image captured from the host vehicle, the traffic flow line formed by the nearby vehicles located in front of the host vehicle, a first angle between the traffic flow line and a driving direction of the host vehicle, or a second angle between a horizontal location of the host vehicle and a line on feature points formed based on at least portions of the nearby vehicles located in front of the host vehicle.

The processor 910 calculates a representative line corresponding to the driving direction of the nearby vehicles based on factors such as, for example, at least one of the traffic flow line, the first angle, the line on the feature points, or the second angle, and generates the virtual auxiliary driving lane based on the representative line.

The processor 910 extracts side line information including left and right driving road lines of the host vehicle and at least portions of sides of nearby vehicles located to the left and right of the host vehicle from the side-view image captured from the host vehicle.

The processor 910 overlaps the left and right driving road lines of the host vehicle with the virtual auxiliary driving lane and applies an offset based on a result of the overlapping to the virtual auxiliary driving lane, to thereby generate a virtual driving lane.

Also, the processor 910 performs at least one of the methods described with reference to FIGS. 1 through 8. The processor 910 executes a program and controls the apparatus for generation the virtual driving lane 900. A code of the program executed by the processor 910 is stored in the memory 930.

The memory 930 stores a front-view image and left and right-view images captured from the host vehicle. The memory 930 stores a virtual auxiliary driving lane and a virtual driving lane generated by the processor 910. The memory 930 stores various pieces of information generated by the processor 910. Also, the memory 930 stores information received through the communication interface 940.

The memory 930 stores various pieces of data and programs. The memory 930 includes a volatile memory or a non-volatile memory. The memory 930 includes a high-capacity storage medium such as a hard disk to store data.

In an example, apparatus for generation the virtual driving lane 900 displays the virtual driving lane on the display 960. In an example, the display 960 may be a physical structure that includes one or more hardware components that provide the ability to render a user interface and/or receive user input. The display 960 can encompass any combination of display region, gesture capture region, a touch sensitive display, and/or a configurable area. In an example, the display 960 can be embedded in the apparatus for generation the virtual driving lane 900. In an example, the display 960 is an external peripheral device that may be attached to and detached from the apparatus for generation the virtual driving lane 900. The display 960 may be a single-screen or a multi-screen display. A single physical screen can include multiple displays that are managed as separate logical displays permitting different content to be displayed on separate displays although part of the same physical screen. The display 960 may also be implemented as an eye glass display (EGD), which includes one-eyed glass or two-eyed glasses.

In an example, the apparatus for generation the virtual driving lane 900 is a traveling vehicle. In another example, apparatus for generation the virtual driving lane 900 is included in the traveling vehicle.

The apparatus for generation the virtual driving lane and the other apparatuses, units, modules, devices, and other components illustrated in FIGS. 1-9 that perform the operations described herein with respect to FIGS. 2-4 are implemented by hardware components. The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-4 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating a virtual driving lane, the method comprising:
    recognizing vehicles proximate to a host vehicle which is disposed on a lane;
    extracting feature information indicating a directionality of the vehicles based on a determination that at least a portion of the lane is obscured; and
    generating a virtual driving lane for the host vehicle based on the feature information,
    wherein the extracting the feature information comprises calculating, based on a front-view image captured from the host vehicle, a traffic flow line formed by front vehicles that are located in front of the host vehicle, a first angle between the traffic flow line and a first driving direction of the host vehicle, and a second angle between a first line parallel to a front portion of the host vehicle and a second line passing feature points located at a rear portion of each of the front vehicles,
    wherein the feature information comprises either one or both of a feature line associated with a driving direction of the vehicles and feature points indicatingthe driving direction of the vehicles.

2. The method of claim 1, wherein
the feature line comprises the traffic flow line formed by the front vehicles that are located in front of the host vehicle, and
the feature points comprise at least a portion of the front vehicles.

3. The method of claim 1, wherein the extracting of the feature information comprises extracting the feature information using eitherone or both of the front-view image captured from the host vehicle and a side-view image captured from the host vehicle.

4. The method of claim 1, further comprising:
calculating a representative line corresponding to the driving direction of the vehicles using any one or any combination of any two or more of the traffic flow line, the first angle, and the second angle; and
generating a virtual auxiliary driving lane based on the representative line.

5. The method of claim 4, further comprising:
extracting, from a side-view image captured from the host vehicle, side line information comprising at least portions of vehicles located on a left side and a right side of the host vehicle, and left and right driving road lines of the host vehicle.

6. The method of claim 5, wherein the generating of the virtual driving lane comprises generating the virtual driving lane based on the virtual auxiliary driving lane and the side line information.

7. The method of claim 4, wherein the generating of the virtual driving lane comprises detecting the lane, and generating the virtual driving lane by overlapping an unobscured segment of the detected lane with the generated virtual auxiliary driving lane.

8. The method of claim 7, wherein the overlapping of the unobscured segment of the detected lane with the generated virtual auxiliary driving lane comprises adjusting a line of the virtual auxiliary driving lane by an offset, in response to detecting the offset, which is between the line of the virtual auxiliary driving lane and the unobscured segment of an actual driving lane.

9. The method of claim 1, wherein the traffic flow line represents a path of the vehicles, which travel in a same direction as the host vehicle.

10. The method of claim 1, wherein the recognizing of the vehicles comprises recognizing the vehicles which are traveling in a same direction as the host vehicle.

11. The method of claim 1, wherein the recognizing of the vehicles comprises forming a virtual box around the host vehicle based on a location of the host vehicle, and recognizing the vehicles within coordinates of the virtual box.

12. The method of claim 1, wherein the feature points comprise either one or both of rear lights and points corresponding to centers on rear trunks of the front vehicles.

13. The method of claim 1, further comprising controlling the host vehicle based on the generated virtual driving lane.

14. A method of generating a virtual driving lane, the method comprising:
recognizing nearby vehicles of a host vehicle;
extracting feature information indicating a directionality of the nearby vehicles, where the extracting of the feature information comprises calculating, based on a front-view image captured from the host vehicle, a trafficflow line formed by front nearby vehicles that are located in front of the host vehicle, a first angle between the trafficflow line and a first driving direction of the host vehicle, and a second angle between a first line parallel to a front portion of the host vehicle and a second line passing feature points located at a rear portion of each of the front nearby vehicles;
calculating a representative line corresponding to a driving direction of the nearby vehicles using any one or any combination of any two or more of the traffic flow line, the first angle, and the second angle;
generating a virtual auxiliary driving lane based on the representative line;
extracting, from a side-view image captured from the host vehicle, side line information comprising at least portions of nearby vehicles located to the left and right of the host vehicle and left and right driving road lines of the host vehicle; and
generating a virtual driving lane for the host vehicle based on the virtual auxiliary driving lane and the side line information,
wherein the feature information comprises either one or both of a feature line associated with the driving direction of the nearby vehicles and feature points indicating the driving direction of the nearby vehicles.

15. The method of claim 14, wherein the generating of the virtual driving lane comprises generating the virtual driving lane based on overlapping the side line information with the virtual auxiliary driving lane.

16. The method of claim 15, wherein the generating of the virtual driving lane comprises applying an offset to the virtual auxiliary driving lane based on a result of the overlapping.

17. A non-transitory computer-readable storage medium storing instructions that, when executed by a processor, causes the processor to perform the method of claim 1.

18. An apparatus for generating a virtual driving lane, the apparatus comprising:
a processor configured to
recognize vehicles proximate to a host vehicle which is disposed on a lane,
extract feature information indicating a directionality of the vehicles, in response to determining that the lane is obscured, and
generate a virtual driving lane for the host vehicle based on the feature information,
wherein the processor is further configured to calculate, based on a front-view image captured from the host vehicle, a trafficflow line formed by front vehicles that are located in front of the host vehicle, a first angle between the traffic flow line and a first driving direction of the host vehicle, and second angle between a first line parallel to a front portion of the host vehicle and a second line passing feature points located at a rear portion of each of the front vehicles,
wherein the feature information comprises either one or both of a feature line associated with a driving direction of the vehicles and feature points indicating the driving direction of the vehicles.

19. The apparatus of claim 18, wherein
the feature line comprises the traffic flow line formed by the front vehicles that are located in front of the host vehicle, and
the feature points comprise at least a portion of the front vehicles.

20. The apparatus of claim 18, further comprising:
a vision sensor configured to capture either one or both of a front view image and a side view image from the host vehicle,
wherein the processor is further configured to extract the feature information using either one or both of the front view image and the side view image.

21. The apparatus of claim 18, wherein the processor is further configured to calculate a representative line corresponding to the driving direction of the vehicles using any one or any combination of any two or more of the traffic flow line, the first angle, and the second angle, and to generate a virtual auxiliary driving lane based on the representative line.

22. The apparatus of claim 21, wherein the processor is further configured to extract, from a side-view image captured from the host vehicle, side line information comprising at least portions of vehicles located on a left side and a right side of the host vehicle and left and right driving road lines of the host vehicle.

23. The apparatus of claim 22, wherein the processor is further configured to generate the virtual driving lane based on overlapping the side line information with the virtual auxiliary driving lane.

24. The apparatus of claim 18, wherein the vehicles are traveling in a same direction as the host vehicle.

25. A digital device, comprising:
a sensor configured to detect vehicles proximate to a host vehicle which is disposed on a lane, and to capture side line information of the lane;
a memory configured to store instructions; and
a processor configured to execute the instructions to
extract feature information associated with a driving direction of the vehicles, in response to determining that the lane is obscured,
generate a virtual auxiliary driving lane based on the feature information, and
generate a virtual driving lane for the host vehicle based on overlapping the virtual auxiliary driving lane with the side line information,
wherein the processor is further configured to calculate, based on a front-view image captured from the host vehicle, a trafficflow line formed by front vehicles of the detected vehicles that are located in front of the host vehicle, a first angle between the traffic flow line and a first driving direction of the host vehicle, and a second angle between a first line parallel to a front portion of the host vehicle and a second line passing feature points located at a rear portion of each of the front vehicles,
wherein the feature information comprises either one or both of a feature line associated with the driving direction of the vehicles and feature points indicating the driving direction of the vehicles.

26. The digital device of claim 25, further comprising a display configured to display the generated virtual driving lane.

27. A method of generating a virtual driving lane, the method comprising:
extracting, based on a front-view image, feature information indicating a directionality of vehicles proximate to a host vehicle;
calculating a representative line corresponding to a driving direction of the vehicles based on the extracted feature information;
generating a virtual auxiliary driving lane based on the representative line;
extracting, from a side-view image, side line information; and
providing a virtual driving lane for the host vehicle based on the generated virtual auxiliary driving lane and the side line information,
wherein the extracting of the feature information comprises calculating, based on the front-view image captured from the host vehicle, a traffic flow line formed by front vehicles that are located in front of the host vehicle, a first angle between the traffic flow line and a first driving direction of the host vehicle, and a second angle between a first line parallel to a front portion of the host vehicle and a second line passing feature points located at a rear portion of each of the front vehicles,
wherein the feature information comprises either one or both of a feature line associated with the driving direction of the vehicles and feature points indicating the driving direction of the vehicles.

28. The method of claim 27, wherein the side line information includes at least respective portions of vehicles located on plural sides of the host vehicle and either one or both of left and right driving road lines.

29. The method of claim 27, wherein the recognizing of the vehicles comprises recognizing the vehicles which are traveling in a same direction as the host vehicle.

* * * * *